United States Patent [19]

Perkowski

[11] 4,159,842

[45] Jul. 3, 1979

[54] SUPPORTING GLASS SHEETS

[75] Inventor: Alfred D. Perkowski, Lower Burrell, Pa.

[73] Assignee: PPG Industries, Inc., Pittsburgh, Pa.

[21] Appl. No.: 651,387

[22] Filed: Jan. 22, 1976

Related U.S. Application Data

[63] Continuation-in-part of Ser. No. 556,594, Mar. 10, 1975, abandoned.

[51] Int. Cl.² .............................................. B66C 1/48
[52] U.S. Cl. ............................................... 294/118
[58] Field of Search .............. 294/118, 119, 115, 112, 294/111, 106, 87.24, 87.22, 87 R, 81 R; 65/374, 106, 260, 273, 83, 348; 214/15

[56] References Cited

U.S. PATENT DOCUMENTS

| | | |
|---|---|---|
| 1,583,541 | 5/1926 | Ferngren .......................... 65/374 M |
| 2,466,992 | 4/1949 | Kurtz .................................... 75/176 |
| 3,089,727 | 5/1963 | Hay, Jr. ................................ 294/118 |
| 3,245,712 | 4/1966 | Mitchell .............................. 294/112 |
| 3,456,985 | 7/1969 | Bullock ............................... 294/119 |
| 3,606,443 | 9/1971 | Painter et al. ...................... 294/106 |
| 3,830,540 | 8/1974 | Sperry ................................. 294/118 |
| 3,850,420 | 11/1974 | Marceau ............................ 294/118 |

Primary Examiner—James B. Marbert
Attorney, Agent, or Firm—Edward I. Mates

[57] ABSTRACT

In the art of supporting a glass sheet by self-closing metal tongs during the thermal treatment of the glass sheet, wherein the glass sheet is gripped between opposing glass gripping members of said self-closing tongs, the improvement comprising engaging said glass sheet surfaces with glass engaging members composed of a tungsten nickel composite essentially free of cobalt and iron during the thermal treatment.

10 Claims, 6 Drawing Figures

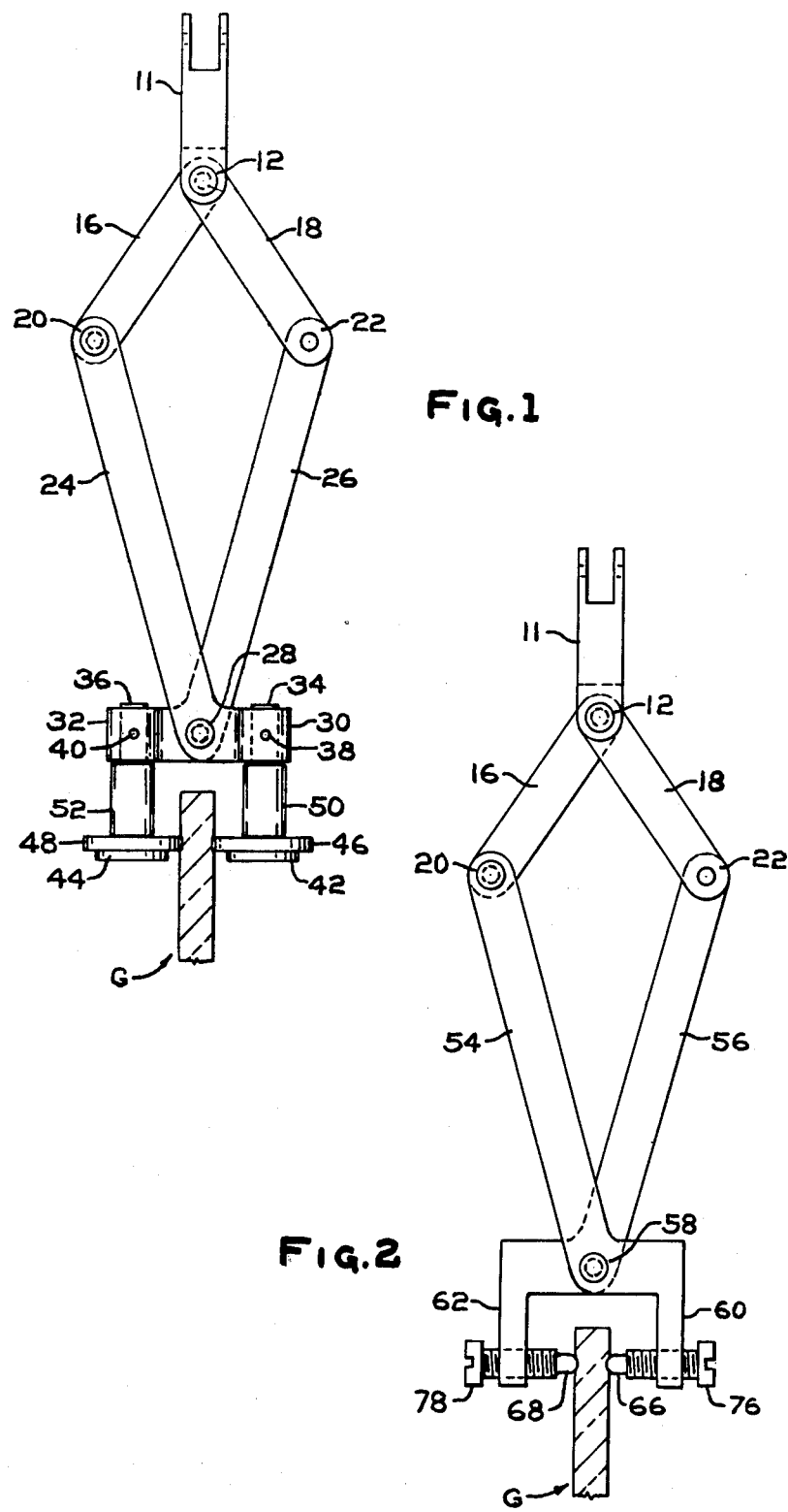

SUPPORTING GLASS SHEETS

RELATION TO OTHER APPLICATION

This is a continuation-in-part of application Ser. No. 556,594 of Alfred D. Perkowski, filed Mar. 10, 1975, now abandoned.

BACKGROUND OF THE INVENTION

This invention relates to supporting glass sheets and specifically refers to an improved method of employing self-closing metal tongs that grip glass sheets during thermal treatment. Tongs have been used for supporting glass sheets in vertical planes for thermal treatment by gripping the opposite glass sheet surfaces near their upper edges. The tongs are supported on an overhead monorail which extends through thermal treatment apparatus by means of a supporting clevis mounted to a carriage that rides on the monorail.

Glass sheets are heated to substantially the softening point before being pressed to shape, cooled for tempering or annealing, or coated. Tongs for gripping glass sheets are provided with tong points or discs that penetrate the glass sheet surfaces and mar the latter and cause dents and scratches in the vicinity of the gripping areas and even deposit oxides of the glass engaging members in the surface of the glass during the temperature cycle. The glass sheet so treated is weakened in the vicinity of the locations where the glass engaging elements of the tongs engage the glass sheet. Hence, a long felt need existed in the glass handling art to provide tongs that do not weaken the glass appreciably in the vicinity of the glass areas that are gripped by the glass engaging elements of the tongs.

DESCRIPTION OF THE PRIOR ART

U.S. Pat. No. 3,184,259 to Almdale discloses a glass engaging element composed of a heavy metal carbide which may be composed of a carbide of one or more of the heavy metals such as tungsten, titanium, vanadium, columbium, tantalum, and including other hard carbides such as chromium carbide, boron carbide, and the like, cemented by sintering into a recess of a cylindrical bore in a ferrous body member by a metal such as cobalt, nickel or mixtures thereof. The cylindrical bore in the body member and the cemented carbide member are so constructed and arranged relative to one another as to avoid stresses in the brazing material which brazes the carbide glass engaging member to the cylindrical bore in the ferrous body member so as to avoid as much as possible stresses resulting from the difference in contraction of the ferrous compositions of the body member and the carbide composition of the carbide glass engaging member.

A typical glass engaging member of tungsten carbide once sold by the assignee of the aforesaid Almdale U.S. Pat. No. 3,184,259 consists essentially of 88 percent by weight of tungsten, 6 percent by weight of cobalt and 6 percent by weight of carbon. This composition, which is no longer available in the commercial market, because titanium carbide is believed to be a superior product, was originally developed to reduce surface damage to glass sheets suspended by glass engaging members of self-closing tongs composed of various metal alloys previously used.

Previously, glass gripping tongs included glass gripping elements composed of tungsten metal alloys of 40 to 80 percent by weight of cobalt, 20 to 35 percent by weight of chromium, 0 to 25 percent by weight of tungsten, 0.075 to 2.5 percent by weight of carbon and 0 to 3 percent by weight of silicon, which family of alloys are available under the trademark STELLITE, and various alloys of iron with carbon, chromium, tungsten or cobalt, tungsten and carbon, which have been used previous to the development of the tungsten carbide glass engaging elements.

Other glass engaging elements in tongs are disclosed in U.S. Pat. No. 3,456,985 to Bullock and 3,655,233 to Twist. These include silicon carbide, aluminum oxide, zirconium oxide, chromic oxide or diamond, and combinations of two or more of the aforesaid refractory abrasive materials. U.S. Pat. No. 3,363,930 to Webb discloses glass engaging elements of an aluminum oxide composition that include minor proportions of other ingredients including at least one of the following: magnesium oxide, calcium oxide, silicon carbide.

U.S. Pat. No. 3,830,540 to Sperry discloses the use of curved segments of wire, preferably of a rigid, nonstricking material such as tungsten, for the glass engaging elements of tongs that grip glass sheets during tempering wherein hot glass sheets are cooled rapidly by flooding the glass surfaces with continuous flows of cold liquid. Tungsten metal is difficult to machine and is extremely costly. Hence, tungsten metal is not a logical condidate for tongs used in mass production required for commercial purposes because of the need for large numbers of tongs for each furnace in operation. Also, tungsten metal tends to oxidize when subjected to continuous use and forms a powder on oxidation, thereby tending to deteriorate and limit its effective life under mass production conditions.

U.S. Pat. No. 1,583,541 to Ferngren teaches the use of a member composed of an alloy of tungsten and nickel in the forming of a molten glass ribbon. The member is located relative to the glass forming apparatus so that it is normally completely surrounded by molten glass so that there is no appreciable exposure to the atmosphere and, under such circumstances, there is practically no oxidation or chemical destruction of its surfaces. The Ferngren patent is mentioned in passing because it discloses the use of tungsten-nickel alloy in contact with molten glass at a relatively constant, high temperature. However, despite the issuance of the Ferngren patent in 1926, the use of tungsten-nickel alloy for glass engaging elements of glass sheet gripping tongs had never been used in glass sheet tempering operations, probably because glass sheet tempering involves exposing the tongs to repeated temperature cycling and oxidizing conditions at least during the heating stage (although oxidizing conditions are also present in the cooling stage of tempering cycles that comprise air quenching), which conditions are minimized or avoided entirely, respectively, in the use of titanium-nickel alloy recited in the Ferngren patent.

Despite the existence of these prior art teachings previously enumerated, there still existed a need for glass engaging elements for self-closing tongs that combined all of the following characteristics, namely, minimum marring of the glass in the glass contacting area, minimum weakening of the glass sheet in the vicinity of the areas of engagement, and life of adequate duration under conditions encountered in mass production use before requiring replacement.

SUMMARY OF THE INVENTION

When glass sheets are thermally treated using tongs having glass engaging members composed of a composition taken from the class consisting of tunsten nickel composites essentially free of cobalt and iron during the thermal treatment, the resulting tempered glass sheet is much stronger in the vicinity of the areas engaged by said members than those produced using tongs having glass engaging members of the prior art compositions available for comparative testing other than tungsten metal. Furthermore, the tungsten nickel composites are easier to work into the shapes desired for the glass engaging members than tungsten metal and combine the best features of tungsten metal in contact with hot glass with sufficient alloying metals to render the resulting alloy more readily workable than pure tungsten metal, thereby reducing the cost of fabricating glass gripping tongs to the point where they are commercially feasible. A particularly preferred embodiment consists of a glass engaging member of an alloy consisting essentially of at least 90 percent by weight of tungsten and the balance consisting essentially of nickel and copper, such as an alloy containing 90 percent by weight of tungsten, 6 percent by weight of nickel and 4 percent by weight of copper, sold commercially under the trademark KU-112.

The present invention will be understood better in the light of a description of illustrative embodiments which follow.

BRIEF DESCRIPTION OF THE DRAWINGS

In the drawings which form part of the description of the present invention and wherein like reference numbers refer to like structural elements, FIG. 1 is a fragmentary elevation view of a pair of self-closing tongs provided with glass engaging members of the rotatable disc type;

FIG. 2 is a corresponding view of a pair of self-closing tongs having glass engaging members of a pointed type having rounded ends;

DESCRIPTION OF THE PREFERRED EMBODIMENTS

Figure 3:
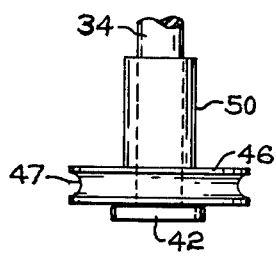
FIGS. 3, 4 and 5 are views of alternate embodiments of glass engaging element similar to the disc type of FIG. 1.

Referring to the drawings, FIG. 1 shows one embodiment of tongs improved by the present invention and FIG. 2 shows another embodiment. In the embodiment of FIG. 1, an apertured clevis 11 is carried by a carriage (not shown) supported on a monorail (not shown). The latter extends through a heating furnace of tunnel-like configuration and a fluid imparting apparatus, neither of which is shown but which are well known in the art.

The fluid imparting apparatus may be either an air blasting station for air tempering apparatus as in U.S. Pat. No. 3,849,100 to Luppino, a station to apply a sublimable cooling medium as in U.S. Pat. No. 3,929,442 to Neely, a flood quenching station as in U.S. Pat. No. 3,830,540 to Sperry, a liquid quenching station as in U.S. Pat. No. 3,794,476 to Michalik and Gorman, or a fluid spraying station for apparatus to impart a coating to a glass sheet gripped by tongs as in U.S. Pat. No. 3,019,136 to Auffenorde and Penone. The present invention may also be used for press bending apparatus as in U.S. Pat. No. 3,290,133 to Thomas. Reference is made to the various patents enumerated for a detailed description of environmental apparatus.

The apertured clevis 11 has an apertured bottom portion that supports a tong support pin 12. The latter also extends through apertures at the upper end portion of a pair of upper links 16 and 18, to pivot the links to the tong support pin 12 at their upper ends. Upper link 16 is apertured at its lower end to receive a link pin 20 whereas upper link 18 is apertured at its lower end to receive a similar link pin 22. Tong arms 24 and 26 are provided with apertured upper ends to receive link pins 20 and 22, respectively, to pivotally attach the upper portion of tong arm 24 to the lower portion of upper link 16 and the upper portion of tong arm 26 to the lower portion of upper link 18. The tong arms 24 and 26 are apertured to receive a common hinge pin 28 to secure the tong arms to one another near their lower portion.

Beyond the apertured portion interconnected by the common hinge pin 28, tong arm 24 forms a horizontally extending apertured extension 30 and tong arm 26 forms a horizontally extending apertured extension 32. Each of the horizontal extensions 30 and 32 is vertically apertured. A rod 34 extends through the vertical aperture in apertured extension 30 and a similar rod 36 extends through a vertical aperture in apertured extension 32. Each rod has a diametrically extending hole that matches with a cross hole extending generally horizontally through the apertured extensions 30 and 32 to permit cotter pins 38 and 40 to secure the rods 36 and 34 to the respective apertured extensions 32 and 30.

The lower end of rod 34 has an enlarged head 42 and the lower end of rod 36 has an enlarged head 44. A disc 46 is rotatably mounted in concentric relation around rod 34 and makes bearing contact with the upper surface of head 42. Another disc 48 is similarly mounted around rod 36 and makes bearing contact with the upper surface of head 44. Sleeves 50 and 52 are rotatably mounted about rods 34 and 36, respectively, above discs 46 and 48. The discs 46 and 48 have appreciable axial extent (for example, about 3 millimeters thick) and make free rotating contact with the opposite major surfaces, of a glass sheet G that is gripped between said discs in pressurized engagement and whose upper edge only is disclosed in the drawings. The tongs structure depicted in FIG. 1 is similar to that of the prior art exemplified by using U.S. Pat. No. 3,089,727 to William J. Hay, Jr., except for the fact that at the time of the Hay patent the glass engaging elements of the tongs were made of a steel alloy.

In the FIG. 2 embodiment, the tongs are provided with the clevis 11, the tong support pin 12, the upper links 16 and 18, and the link pins 20 and 22 as in the first embodiment. However, the tong arms 54 and 56 which are apertured at their lower portion to receive a common hinge pin 58 are further provided with L-shaped members having downwardly extending portion 60 and 62 respectively. These lower portions extend vertically downward and have essentially horizontally extending apertures which receive glass engaging members 66 and 68. The latter are either rounded inner extremities of threaded bolts 76 and 78 or rounded tips welded to the inner extremities of the threaded bolts. The glass engaging members 66 and 68 have rounded glass engaging ends.

The freely rotating glass engaging elements 46 and 48 of the first embodiment or the rounded glass engaging elements 66 and 68 of the second embodiment are composed of a novel glass engaging composition according to the present invention. The composition may be a tungsten nickel composite essentially free of cobalt and iron such as may be machined to form an externally threaded bolt from an elongated rod of said composite or tungsten composite tip welded to the inner end of a metal bolt.

Figure 4:
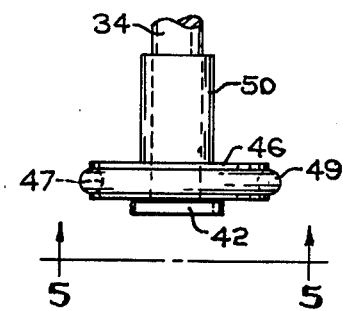
Figure 5:
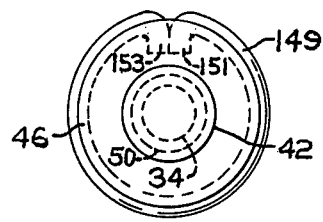

FIGS. 3 to 6 illustrate alternate embodiments of the present invention. FIGS. 3 and 4 disclose only elevational views of glass engaging members and their supports, FIG. 4 showing the assembly of a ring type glass engaging element and its support and FIG. 3 only the support. FIG. 5 is a view along the lines 5—5 of FIG. 4 showing how a wire may be used instead of a ring with the support of FIG. 3.

Since the glass engaging elements are composed of a composition that is more expensive than the steel alloy customarily used for glass gripping tongs, the present invention includes embodiments in which the superior glass engaging composition is used in limited amounts. For example, in the embodiment of FIGS. 3, 4 and 5, the disc 46 is made of stainless steel and is provided with a peripheral groove 47 that receives either a ring 49 (FIG. 4) that is heated for expansion and contracts by cooling to fit into the peripheral groove 47. A wire 149 having ends 151 and 153 fitting within radially extending holes in the disc 46 may be wound around the peripheral groove 47. The wire 149 or ring 49 is made of the special glass engaging material according to the present invention and is supported like a tire on a rim, the disc 46 and its peripheral groove 47 being similar to a wheel and its rim to support either the ring 49 of FIG. 4 or the wire 149 of FIG. 5.

Figure 6:
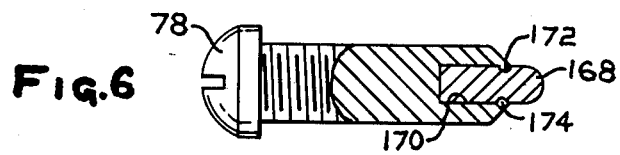
FIG. 6 is an enlarged sectional view of a glass engaging element similar to that of FIG. 2.

The embodiment of FIG. 6 is similar to that of FIG. 2, except that instead of making the entire threaded bolt 78 of expensive material, only a small insert 168 is made of the glass engaging composition and the bolt 78 is provided with a recess 170 to receive the insert 168. To insure that the insert 168 fits snugly within the recess 170, the insert 168 is provided with a peripheral groove 172 and the inner end of the threaded bolt 78 is provided with a peripheral lip 174. The insert 168 is forced into the recess 170 of the threaded bolt 78 until the peripheral groove 172 and peripheral lip 174 are engaged. The insert 168 can be made slightly smaller than the recess 170 and the recess provided with shoulders to receive the insert in the manner disclosed in U.S. Pat. No. 3,184,259 to Almdale, the description of said construction in said patent being incorporated herein by reference.

While FIGS. 3 to 6 illustrate only one glass engaging member composed of the preferred composition as taught by the present invention, it is understood that these glass engaging elements are one of two elements similar to those illustrated in the tongs of FIGS. 1 and 2. The tongs and the support for the glass engaging elements are composed of a steel alloy of the type used in tongs prior to the present invention.

In order to assess the benefits of the present invention compared to the prior art glass engaging elements available for testing, six groups of glass sheets were tempered using tongs with pointed glass engaging elements. Each group of glass sheets was supported by tongs provided with glass engaging elements of a unique composition for the group as enumerated in the Table 1. In addition, a seventh group of six glass sheets was tempered using tongs provided with disc shaped glass engaging members of the compositions as in group 5.

TABLE 1

| Group | Composition of Glass Engaging Element of Tongs |
|---|---|
| 1 | 90 percent tungsten, 6 percent nickel, 4 percent copper (Tungsten Alloy KU-112) |
| 2 | 95 percent tungsten, 3 percent nickel, 2 percent iron (Tungsten Alloy KUA-5) |
| 3 | 80 percent titanium, 10 percent nickel, 8 percent molybdenum, 2 percent iron (referred to as titanium carbide) |
| 4 | 12 percent tungsten, 50 percent cobalt, 30 percent chromium, 2.5 percent carbon, balance others (STELLITE No. 1) |
| 5 | 90 percent iron, 5 percent chromium, 1.2 percent tungsten 0.35 percent carbon, balance others (Pressurdie No. 2) |
| 6 | 70 percent iron, 18.5 percent tungsten, 7.6 percent cobalt, 0.8 percent carbon, balance others (Bonded Carbide) |
| 7 | Same composition as Group #5 except in the form of disc tongs |

The tests for each set involved suspending each of six rectangular glass sheets 25 inches by 12 inches by 7/32 inch nominal thickness (304.8 millimeters by 635 millimeters by 5.6 millimeters) by three tongs, each of whose glass engaging members engaged the glass sheet at a distance of about 0.3 inch (7.6 millimeters) below the upper longest edge of the sheet at distances of about 3 inches (76.2 millimeters), 12.5 inches (317.5 millimeters) and 22 inches (559.8 millimeters) from a corner of the longest edge while each sheet was heated and cooled according to a conventional production cycle of temperatures for tempering glass sheets of said thickness.

Three additional glass sheets were tempered as a group of control samples using only two tongs of the Group 7 type to grip these latter glass sheets at about 3 inches (76.2 millimeters) from each longitudinal end.

After completing the tempering, the six sets of glass sheets tempered by pointed tongs were inspected under a 60 power microscope at the tong marks with the results reported in Table II for the center tong marks:

TABLE II

| APPEARANCE OF TONG MARKS | |
|---|---|
| Group No. | Remarks |
| 1 | No vents visible. Smooth appearance. Light red-brown deposits of oxide at marks. |
| 2 | No vents visible. Shows scattered, heavier brownish deposits at marks. |
| 3 | Small and large vents (3 to 12 per sample) on edge of marks. Brown scaly fused deposit. Vents .01 to .03 inch (.25 to .76 millimeter) long; .02 to .03 inch (.5 to .76 millimeter) deep. |
| 4 | Small and large vents (4 to 15 per sample). Edge and inside marks. Brown scaly fused deposits. Vents .01 to .04 inch (.25 to 1.02 millimeters) long; .01 to .02 inch (.25 to .5 millimeter) deep. |
| 5 | Small and large vents (2 to 8 per sample) on edge and inside marks. Heavy brown scaly fused deposits. Vents .01 to .03 inch (.25 to .76 millimeter) long; .01 to .02 inch (.25 to .5 millimeter) deep |
| 6 | Small and large vents (4 to 9 per sample) at edge of marks. Heavy brown scaly fused deposit. Vents .01 to .025 inch (.25 to .63 millimeter) long; .01 to 0.15 inch (.25 to .38 millimeter) deep. |
| 7 | Small and large vents (4 to 10 per sample) on edge and inside marks. Heavy brown scaly fused deposits Vents .01 to .035 inch (.25 to .89 millimeter) long; .01 to .02 inch (.25 to .5 millimeter) deep |

After the aforesaid visual inspection of the center tong marks under a 60 power microscope, the samples including the control samples were subjected to a beam load test in which each test sample of each group and the three control samples 43 to 45 were supported over a horizontal table with each sample in turn resting on a pair of beams extending across the width of the glass sheet. The beams were 22 inches (558.8 millimeters) apart and each glass sheet mounted with its center line disposed at the center of the space between the glass sheet supporting beams. An additional pair of beams 10 inches (254 millimeters) apart rested on the upper surface of each glass sheet sample tested with the center of the glass sheet sample arranged at the center of the space between the additional pair of beams. A glass plate having a width equal to that of the glass sheet specimen rested on the upper pair of beams with its side edges aligned with the side edges of the glass sheet specimen and an additional force applying beam was arranged over the entire width of the glass sheet along a line disposed over the longitudinal center of each glass sheet sample. Force was applied at a constantly increasing rate toward the force applying beam and the stress at failure calculated from the formula $S = 18W/bt2$, where S is the stress at failure, W is the load at failure, b is the width of the glass sheet specimen, and t is the thickness of the specimen.

The force was increased at a rate of 169 pounds (76.7 kilograms) per minute, according to a standard test used at the research laboratories of PPG Industries, Inc., to test the strength of glass specimens. The stress at failure was so determined for each sheet in each set and the average stress at failure value determined for each set. The control samples had the largest stress at failure values, so that the average of their three values was set at 100 percent and the average stress at failure values of other sets were calculated for each set and compared to the stress at failure average value for the set of control samples.

The results tabulated in Table III show the relative values of the average stress at failure of each group relative to the average stress at failure of the control group expressed as percentage of strength relative to that of the average strength of the control samples. All test specimens of the seven test groups failed in the vicinity of the central tong mark, whereas the control specimen #43 failed at a weakened portion of an edge seam and control specimens #44 and #45 failed at surface scatches near a line aligned below the line of force application (which would have been in the vicinity of a center tong mark if the control specimens were gripped by a third tong in the center as were the test specimens of Groups 1 to 7).

TABLE III

Comparison of Average Stress at Failure Values

| Group No. | Strength at Failure | Average Loss of Strength Compared to Control |
|---|---|---|
| Control | 100 percent | — |
| 1 | 92 percent | 8 percent |
| 2 | 72 percent | 28 percent |
| 3 | 61 percent | 39 percent |
| 4 | 49 percent | 51 percent |
| 5 | 55 percent | 45 percent |
| 6 | 63 percent | 37 percent |
| 7 | 55 percent | 45 percent |

After the results of the tests were evaluated, production tongs having glass engaging elements of the Group 4 composition, previously used in commercial production, were replaced by tongs having glass engaging elements of the Group 1 composition in commercial production at one plant. For the first six month period of using tongs with the replaced glass engaging members at the plant, a $5,000 savings per annum due to reduction of glass breakage during production of one pattern alone was experienced, compared to the breakage resulting from the use of tongs provided with the prior art glass engaging elements. Significant additional savings from the production of other patterns at this plant and other plants are expected as the long conversion program continues.

Further mass production operations have been conducted using the FIG. 2 embodiment of tongs having threaded bolts of the type of Group 1. The bolts were found to be durable for several thousand production cycles before they were reworked, except for cases where tongs were dropped or otherwise mishandled. Reworking the tungsten alloy elements represented no greater problem than reworking the stainless steel elements of prior art tongs that caused surface damage in glass sheets gripped thereby for thermal treatment. Furthermore, similar reworking was required for glass engaging elements of prior art tongs.

The tongs containing glass engaging elements of the type containing tungsten based composites of the type of Group 1 were also used in tempering glass sheets using as a cooling medium sublimable soft particles of carbon dioxide. Venting, which existed with tongs provided with prior art glass engaging elements, was virtually eliminated when the glass contacting elements were changed to the tungsten based composites of the present invention.

In other tests, tongs containing pure tungsten wire as the glass engaging elements were used to replace tongs having glass engaging elements of STELLITE No. 1 in tempering experiments of the dip quenching type when considerable breakage was experienced under high heat transfer conditions when glass sheets 0.090 inch (2.3 millimeters) and 0.125 inch (3 millimeters) thick gripped by such tongs were immersed after heating in polyoxyalkylene glycols. Breakage was reduced considerably in glass sheets of such thickness, when tongs having glass engaging elements of tungsten metal were used as the glass engaging elements instead of the STELLITE No. 1 elements under the same conditions otherwise. An additonal test of more than 60 glass sheets tempered by dip quenching using tungsten as the glass engaging elements of tongs tested showed no breakage and no vents or metal deposits at the tong marks on the glass. These tongs with tungsten metal glass engaging elements were used in more than 1,300 glass sheet tempering experiments involving cooling by air blasts, cooling by blasts containing sublimable $CO_2$ particles and cooling by exposure to liquids over a period of several years. The tungsten elements that engaged the glass showed considerable wear after such use, leaving doubts as to their practicality for mass production purposes.

In still other tests, tongs having disc shaped glass engaging elements of the composition of Group 1 were compared with those having disc shaped glass engaging elements of the composition of Group 5 in the production of parts for Chrysler and General Motors which were gripped by tongs during a commercial production of these parts by press bending followed by tempering by quenching with air blasts. Two tongs were used to support the Chrysler part and four tongs to support the General Motors parts during processing. After stress measurements using laser beam technology to determine center tension stress and a DSR refractometer described in an article by R. W. Ansevin published in ISA Transactions, Volume 4, October 1965, had determined that the parts had adequate temper stresses, they were subjected to beam loading tests by applying a load to the center of a steel bar aligned over the worst tong mark for that part using a 2 inch (50.8 millimeters) span over an aligned with the worst tong mark and the worst tong mark facing down so as to be in tension when the load was applied to the top surface. The load was increased by 50 pounds (22 kilograms) per minute. The average breaking load for the glass parts was 401 pounds (182 kilograms) for the glass parts engaged by Group 5 glass engaging members and 566 pounds (257 kilograms) for the glass parts engaged by Group 1 glass engaging members, thus indicating a 29 percent improvement in strength at the long mark in a direct comparison of tongs provided with disc-shaped glass engaging members.

As a result of these lattermost tests, new tongs for use during press bending and tempering certain specialty parts provided with disc shaped glass engaging elements of the tungsten-nickel composition of Group 1 were substituted for prior art tongs having disc shaped engaging elements of the composition of Group 5 to suspend these specialty parts during press bending and tempering when considerable breakage of glass was experienced with the prior art tongs. Breakage was reduced considerably after substituting the new tongs.

While the exact reason for the improvement in tempering operations using either air or soft sublimable particles or liquid immersion for the cooling step is not known, it has been theorized that the fusion of a low temperature glass and a low carbon steel develops adherence promoted by the presence of a layer of iron oxide on the glass engaging element that contains iron as a component. The iron oxide that forms reacts chemically with the glass that is being gripped. This iron oxide surface has a propensity to react and fuse with the glass surface at elevated temperatures and during cooling, the metal contracts more than the glass, thus supplying a tensile stress in the outer regions of the contact zone as a result of the geometry of contact between the glass engaging metal member and the glass. Therefore, venting is experienced in the region of the contact zone between an iron alloy glass contacting member and soda lime glass. Similar conditions exist when a significant amount of cobalt rather than iron is present in the glass engaging members of the tongs. Therefore, the glass contacting elements of tongs according to the present invention are essentially free of iron and cobalt (that is, if any iron or cobalt is present, it is only in insignificant amounts resulting from impurities).

In using glass engaging elements composed of tungsten metal or tungsten metal composites essentially free of iron or cobalt, a tungsten oxide film forms at elevated temperatures and this film is not easily assimilated into the glass structure. Therefore, it is believed that the tong does not adhere to the glass, so that there is no fusion with the glass, which causes the tensile stress which gives rise to venting. It should also be noted that for pure tungsten or composites containing at least 90 percent tungsten, the expansion coefficient to the metal is nearly the same as some glass compositions.

In the case of tungsten carbide, which is a ceramic material rather than a metal composite, the material has a high oxidation resistance and thus avoids the formation of a tungsten oxide film on the interfacial surface between the glass contacting element and the glass. Furthermore, tungsten carbide is believed to be very abrasive so that contact of the material with cold glass under the pressure of the glass contacting elements is believed to cause surface damage of the glass due to friction, particularly if there is any motion of the glass contacting element of the tongs relative to the glass during the tempering operation.

The form of the invention shown and described in this disclosure represents illustrative preferred embodiments thereof. It is understood that various changes may be made without departing from the gist of the invention as defined in the claimed subject matter which follows.

I claim:

1. In the art of supporting a glass sheet by self-closing tongs during thermal treatment comprising first heating said glass sheet to an elevated temperature and then cooling said heated sheet wherein said glass is gripped between opposing glass contacting members of said self-closing tongs that engage the opposite surfaces of said glass sheet and tend to damage said surfaces during said thermal treatment thereof, the improvement comprising engaging said glass sheet surfaces under oxidizing conditions with glass contacting members composed of a tungsten-nickel composite that is essentially free of cobalt and iron to enable said glass sheet to be essentially free of vents, to have minimum marring and minimum weakening in the vicinity of the areas contacted by said glass contacting members as a consequence of said contact during said thermal treatment, said composite being composed essentially of at least 90 percent by weight tungsten and sufficient alloying metal to render said composite more readily workable than tungsten metal.

2. The improvement as in claim 1, comprising engaging said glass sheet surfaces with a glass contacting member consisting essentially of at least 90 percent by weight of tungsten and the balance consisting essentially of nickel and copper.

3. The improvement according to claim 2, comprising engaging said glass sheet surfaces with a glass contacting member consisting essentially of approximately 90 percent tungsten, approximately 6 percent nickel and approximately 4 percent copper by weight.

4. Apparatus for conveying a glass sheet during thermal treatment wherein said glass sheet is first heated to an elevated temperature under oxidizing conditions and then cooled under oxidizing conditions comprising a pair of tongs having a portion that does not contact glass during said treatment, said portion being composed of a steel alloy that tends to damage glass on contact therewith at an elevated temperature under oxidizing conditions, said tongs having a pair of glass contacting members composed of a tungsten-nickel composite that is essentially free of cobalt and iron to enable said glass sheet to be essentially free of vents, to have minimum marring and minimum weakening in the vicinity of the areas contacted by said glass contacting members as a consequence of said contact during said thermal treatment, said composite being composed essentially of at least 90 percent by weight tungsten and sufficient alloying metal to render said composite more readily workable than tungsten metal.

5. Apparatus as in claim 4, wherein said glass contacting members consist essentially of at least 90 percent by weight of tungsten and the balance essentially nickel and copper.

6. Apparatus as in claim 5, wherein said glass contacting members consist essentially of approximately 90 percent tungsten, approximately 6 percent nickel and approximately 4 percent copper by weight.

7. Apparatus as in claim 4, wherein each said glass contacting member is supported by a disc having a peripheral groove that supports said glass contacting member.

8. Apparatus as in claim 7, wherein said glass contacting member is a ring that is fit into said peripheral groove by thermal contraction after said ring is thermally expanded to slide over said peripheral groove.

9. Apparatus as in claim 7, wherein said glass contacting member is a wire having ends received in adjacent radial grooves in said disc and extending between said ends peripherally of said disc within said peripheral groove.

10. Apparatus as in claim 4, wherein said glass contacting members are provided on support means composed of a metal composition that would significantly weaken said glass by contact during said thermal treatment under oxidizing conditions.

* * * * *

UNITED STATES PATENT AND TRADEMARK OFFICE
CERTIFICATE OF CORRECTION

PATENT NO. : 4,159,842

DATED : July 3, 1979

INVENTOR(S) : Alfred D. Perkowski

It is certified that error appears in the above-identified patent and that said Letters Patent are hereby corrected as shown below:

Column 8, line 11, "long" should be --tong--.

Column 9, line 19, "long" should be --tong--.

Signed and Sealed this

Ninth Day of October 1979

[SEAL]

Attest:

RUTH C. MASON
Attesting Officer

LUTRELLE F. PARKER
Acting Commissioner of Patents and Trademarks